(12) United States Patent
Yeung

(10) Patent No.: US 8,563,139 B2
(45) Date of Patent: *Oct. 22, 2013

(54) NON-HYDRATING PLASTER COMPOSITION AND METHOD

(75) Inventor: Lee K. Yeung, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 1331 days.

This patent is subject to a terminal disclaimer.

(21) Appl. No.: 12/107,382

(22) Filed: Apr. 22, 2008

(65) Prior Publication Data

US 2009/0264556 A1    Oct. 22, 2009

(51) Int. Cl.
*B32B 27/30*    (2006.01)

(52) U.S. Cl.
USPC ........... 428/522; 428/507; 428/511; 428/523; 524/130; 524/423

(58) Field of Classification Search
USPC ........... 428/507, 511, 522, 523; 524/423, 130
See application file for complete search history.

(56) References Cited

U.S. PATENT DOCUMENTS

| | | | |
|---|---|---|---|
| 3,854,985 A | 12/1974 | Suzuki et al. | |
| 3,869,415 A | 3/1975 | Williams | |
| 3,935,021 A | 1/1976 | Greve et al. | |
| 4,155,887 A | 5/1979 | Hetson | |
| 4,157,264 A * | 6/1979 | Kennedy-Skipton | 524/5 |
| 4,265,964 A | 5/1981 | Burkhart | |
| 4,304,704 A | 12/1981 | Billings | |
| 4,661,161 A | 4/1987 | Jakacki et al. | |
| 4,845,144 A | 7/1989 | Piccirilo | |
| 4,849,018 A | 7/1989 | Babcock et al. | |
| 4,876,142 A | 10/1989 | Piccirillo | |
| 4,904,709 A | 2/1990 | Hermele | |
| 4,927,463 A | 5/1990 | Kloetzer et al. | |
| 5,191,049 A | 3/1993 | Enomoto et al. | |
| 5,437,722 A | 8/1995 | Borenstein | |
| 5,746,822 A | 5/1998 | Espinoza | |
| 5,779,786 A | 7/1998 | Patel | |
| 5,879,446 A | 3/1999 | Patel et al. | |
| 5,879,825 A | 3/1999 | Burke et al. | |
| 6,187,887 B1 | 2/2001 | Albrecht et al. | |
| 6,228,163 B1 * | 5/2001 | Espinoza et al. | 106/778 |
| 6,299,679 B1 | 10/2001 | Montoya | |
| 6,342,284 B1 | 1/2002 | Yu et al. | |
| 6,409,824 B1 * | 6/2002 | Veeramasuneni et al. | 106/772 |
| 6,548,589 B2 | 4/2003 | Widmer et al. | |
| 6,686,044 B2 | 2/2004 | Nakai et al. | |
| 6,689,200 B2 | 2/2004 | Scarborough et al. | |
| 6,800,311 B2 | 10/2004 | Villwock | |
| 6,805,741 B1 * | 10/2004 | Liu et al. | 106/785 |
| 6,998,430 B2 | 2/2006 | Tanasi | |
| 7,244,304 B2 | 7/2007 | Yu et al. | |
| 2006/0130708 A1 | 6/2006 | Calva Garcia et al. | |
| 2006/0211805 A1 | 9/2006 | Willimann et al. | |
| 2007/0044687 A1 | 3/2007 | Blackburn et al. | |
| 2007/0227405 A1 | 10/2007 | Yu et al. | |
| 2009/0197992 A1 | 8/2009 | Charmock | |

FOREIGN PATENT DOCUMENTS

| | | |
|---|---|---|
| EP | 1064236 | 8/2002 |
| JP | 62-187152 | 8/1987 |
| JP | 1-224251 | 9/1989 |
| JP | 4-224153 | 8/1992 |
| JP | 2006-521276 | 9/2006 |
| WO | 2005070118 | 8/2005 |
| WO | WO 2006/070960 | 7/2006 |
| WO | 2007/027530 | 3/2007 |

* cited by examiner

*Primary Examiner* — Peter D Mulcahy
(74) *Attorney, Agent, or Firm* — Greer, Burns & Crain, Ltd.; Pradip Sahu; Philip T. Petti

(57) ABSTRACT

A method of finishing an interior wall includes the steps of preparing a substrate of building panels comprising gypsum, cement or combinations thereof, said substrate having a surface, followed by applying a coating to the substrate, said coating comprising 5-20% by weight of a latex emulsion binder, 40-80% by weight calcium sulfate hemihydrate, 0.05-2% by weight of a set preventer and 20-60% by weight water.

13 Claims, No Drawings

NON-HYDRATING PLASTER COMPOSITION AND METHOD

CROSS REFERENCE TO RELATED APPLICATION

This application is related to U.S. Ser. No. 12/107,396 entitled "Non-hydrating Plaster Composition and Method," filed concurrently herewith and herein incorporated by reference.

BACKGROUND OF THE INVENTION

This invention relates to articles, such as a coated building panel, that contain calcium sulfate hemihydrate. More specifically, it relates to a plaster-like material for use in coatings and articles that has the feel of plaster during application but does not hydrate.

Gypsum is a common material that is widely used in the building industry for a number of uses. The usefulness of this material is due, at least in part, to its reasonable cost and the ability to form it into substantially any shape. Calcium sulfate hemihydrate, also known as stucco or calcined gypsum, is mixed with water to form a paste or slurry. The slurry is shaped by any known means, such as, but limited to, casting it into a mold, spraying it, pouring it onto a surface or applying it with a trowel. The calcium sulfate hemihydrate reacts with the water in a hydration reaction to form an interlocking matrix of set calcium sulfate dihydrate (gypsum) crystals. Although some shrinkage often occurs, the gypsum generally retains the shape into which it was formed prior to completion of the setting reaction.

Interior walls are typically made of gypsum panels, such as SHEETROCK® brand gypsum panels, cement panels or the like. While the use of panels allows large areas of wall to be covered quickly, seams between the panels must be finished to make a monolithic surface that is ready to receive paint or another decorative finish.

Finishing of the panels is usually a time consuming process. After the boards are hung, a coat of joint compound is applied to the seams and the nail heads. As it dries, the joint compound shrinks, leaving a depression in the area of the seam that is the last to dry. The joint compound is allowed to dry overnight, then is sanded when it is completely dry. Dust from sanding is removed with a tack cloth or damp sponge. A second coat of joint compound is applied and allowed to dry overnight followed by sanding and dedusting of the surface. For a quality job, the process is repeated with a third coat of joint compound. Finishing of the surface takes at least three days, even after the boards are hung. This process can also be used to repair damaged walls.

Although this process takes time, it produces a smooth, monolithic surface at a relatively low cost. It is a simple process and can often be done by a homeowner without professional assistance. But there are drawbacks in the amount of time needed to complete such a job. In new construction, installation of cabinets, carpet, fixtures and other finishing items is held up while waiting for the finishing to be completed. Workmen have to keep returning to the same job site several days in a row. For a homeowner doing repairs or redecorating, disruption of the home is prolonged. Repeated sanding of the surface generates fine dust that permeates closets and cabinets, requiring a thorough dusting throughout the home. A quicker and cleaner method of finishing walls would be desired by both contractors and homeowners.

An alternative method of finishing interior walls and ceilings includes applying a veneer or "skim" coat of plaster over the entire gypsum panel surface. This technique results in a stronger surface that is less likely to chip, dent, scratch or incur nail pops than finishing using a joint compound. The surface needs no additional preparation. Use of colorized plaster can even eliminate the need for painting of the plastered surface. A single coat of plaster over the entire wall surface is faster than applying multiple coats of a joint compound when drying time is considered.

The availability of a ready-mixed plaster composition would be desirable for a number of applications. Such compositions could be used, for example, for finishing walls, dental applications, casts, moldings, machinable articles, sprayable plasters, and other applications that will be known by one skilled in the art.

In U.S. Pat. No. 4,661,161, a ready-mixed, setting-type joint compounds was formulated using calcium sulfate hemihydrate as the binder. A set retarder was added to the wet paste to stop the hemihydrate from hydrating to the dihydrate form. Hydration was intended to be initiated by the addition of a set accelerator just prior to use of the joint compound. However, it was found that the set retarder degraded over time, allowing hydration to occur during the shelf-life of the product.

A ready-mixed, setting-type joint compound is disclosed in U.S. Pat. No. 5,746,822. This composition uses phosphates, such as tetra sodium pyrophosphate for a long-lasting set retardation and accompanying long shelf life. However, these joint compounds were found to be unsatisfactory for many applications as they had a relatively low strength.

U.S. Pat. No. 5,779,786 reveals a ready-mixed, setting-type joint compound using acrylic acid and acrylamide repeating units. These formulations have reduced water bleed and sedimentation than other joint compounds, however they are also low in strength, and useful only in certain applications.

The compositions above are intended for use as joint compounds and are formulated to that use. However, a typical joint compound does not have the same "feel" as a plaster composition as it is being applied. A skilled plasterer knows exactly how much pressure to apply to the trowel to get the correct thickness when applying a skim or veneer coating of plaster to a wall. Use of a conventional ready-mixed joint compound by a plasterer would require learning the feel of the joint compound in order to apply it correctly. More importantly, joint compound skim-coating is labor and time intensive, requiring application of the compound, drying time and sanding of the entire surface, which also creates a large amount of dust. On the other hand, veneer plastering only requires application and densification of the plaster to attain a superior smooth monolithic surface.

Thus there is a need in the art for a composition that has the same working properties as plaster to facilitate application to a wall, such as plaster feel, no sanding, and fewer application steps.

SUMMARY OF THE INVENTION

A method of finishing an interior wall includes the steps of preparing a substrate of building panels and applying a coating mixture to the substrate, where the coating mixture includes 5-30% by weight of a latex emulsion binder, 40-80% by weight calcium sulfate hemihydrate, up to about 8% by weight of a set preventer and 20-60% by weight water. The building panels are made of gypsum cement or mixtures thereof.

The coating mixture of this invention is a ready-mixed composition for application to building panels. Ready-mix compositions have advantages over conventional plasters in that there is no need to transport vessels to mix plaster or water to a job site to aid in preparing the plaster. The water used to mix the composition is consistent quality, leading to coating compositions that are less likely to engage in undesirable side reactions. Further, the plasterer on site need not take the time to prepare batches of plaster for use. Ready-mix compositions are also advantageous during remodeling or patching jobs because they do not require pouring and mixing of bagged plaster, which creates dust that can contaminate an already occupied living or working space.

Because the mixture is made with calcium sulfate hemihydrate, it has the same feel upon application as a conventional plaster. The plasterer will, therefore, not have to learn the feel of the new composition and should be able to apply a skim coat of the mixture to substantially the same accuracy as conventional plaster. The amount of pressure needed to produce a mixture of a particular thickness will not have to be learned again.

The method of finishing a wall is faster than taping, applying joint compound, and sanding. The conventional method requires waiting up to 24 hours between coats so that the joint compound dries sufficiently for the application of the next coat. When utilizing the present method, skim coat of the mixture can be applied, followed by a second coat within the same day. At least one, and often two, days can be saved by this method.

DETAILED DESCRIPTION OF THE INVENTION

These and other needs are met by the present invention which relates to a coated building panel and a calcined gypsum-containing article. The coated panel includes a building panel and a coating mixture. Calcium sulfate hemihydrate is dispersed in a latex polymer matrix as a basis for the mixture. The polymer matrix is substantially water-free and further includes a set preventer distributed throughout the matrix. Similar blends of the calcium sulfate hemihydrate and latex polymer can also be formed into an article. A set preventer is also present in both embodiments of the invention. Biocides, water retainers, antisedimentation additives, crack preventers and rheology modifiers are optional additives to the polymer matrix.

Any building panel can be used in the embodiment of the invention, including, but not limited to panels of gypsum, cement and blends thereof. In some embodiments the panels are made of gypsum, such as SHEETROCK® brand gypsum panels by United States Gypsum Co. of Chicago, Ill. The panels are made in a continuous, high-speed process in which a paper facing is laid down on a conveyor. A slurry of calcium sulfate hemihydrate or calcined gypsum, water and additives is poured onto the paper and topped with a second facing to make a "sandwich." The gypsum slurry is distributed across the width of the sandwich and formed to a constant thickness, then allowed to set and harden. When the slurry is about 50% hydrated, the boards are cut to an appropriate length and moved to a kiln to finish drying. At least some embodiments of the invention utilize IMPERIAL® gypsum panels by United States Gypsum, Co. (Chicago, Ill.).

The calcium sulfate hemihydrate used to make the panel can be any type. An alpha form is available by calcining gypsum under pressure, making it expensive relative to the beta form. Gypsum calcined at atmospheric pressure is the beta-calcined form. Beta-calcined gypsum has more needle-like or plate-like crystal morphology compared with the alpha form. Since the alpha form is less acicular, it flows more easily when dispersed in a slurry, requiring less water than the beta form for equivalent flowability.

Cement panels, such as DUROCK® brand cement panels, are made by pouring a slurry of cement, water and additives onto a scrim or mesh facing material. Prior to full set, the panels are cut to size and moved to a kiln to accelerate the drying process. Cement panels are useful in basements, bathrooms or anywhere where water is likely to be present. The use of panels made of a mixture of cement and calcined gypsum is also contemplated.

A substrate surface is made by attaching the building panels to a framework of studs that form the support for a wall or ceiling. Adjacent panels are abutted against each other, making the joint between the panels as small as practical. The panels can be cut to accommodate the size or shape of a particular wall or ceiling and are attached by any known means of doing so. Generally, the panels are attached by means of nails or screws. In attaching the panels, the nails or screws should be driven into the panel sufficiently deep that none of the head is visible above the substrate surface. Each nail or screw leaves a depression in the surface that is filled by the mixture.

The mixture to be applied to the substrate includes a latex emulsion polymer as a binder. The latex emulsion polymer forms the continuous phase of the mixture, holding it together both in the wet state and after the coating has dried. The exact type and amount of latex emulsion polymer added depends on the surface to which it is applied. Larger concentrations of the latex emulsion polymer are more suitable for use with less porous substrates.

Some embodiments of the mixture use a latex emulsion polymer is made from monomers including vinyl acrylates, vinyl acetates, vinyl chlorides, ethylenes and substituted ethylenes. Polyurethane and polyester emulsions are also useful. Poly vinyl acetate is suitable for a mixture to be applied to gypsum panels, but may have applicability to other substrates as well. Preferably, the latex emulsion polymer has a molecular weight of more than 10,000 Daltons. Amounts of the latex emulsion range from about 5% to about 20% by weight based on the weight of the mixture composition. Examples of suitable latex emulsions include AC 1265 polyvinyl acetate homopolymer emulsion, HP 19-176 polyvinyl acetate copolymer emulsion and HP 41-830 vinyl acetate emulsion available from Halltech Inc. (Ontario, Canada) and VF-812 methacrylic latex polymer available from Engineered Polymer Solutions of Marengo, Ill. The calculated amount of the latex emulsion is based on an emulsion of 40-60% solids. If a latex having a different solids content is selected, the total amount of latex emulsion should be changed to yield an equivalent weight of the latex solids.

Another component of the mixture is calcium sulfate hemihydrate. Any type of calcium sulfate hemihydrate is useful in this mixture as described above with respect to the building panels. When the mixture is applied to gypsum-based building panels, the calcium sulfate hemihydrate used is optionally the same as that used in the building panel or it may be a different type. Many embodiments of the mixture utilize beta-calcined calcium sulfate hemihydrate. Preferably, the calcium sulfate hemihydrate is present in amounts of about 40% to about 80% by weight of the mixture.

The set preventer is added to the mixture to prevent hydration and set of the calcium sulfate hemihydrate. Use of the hemihydrate form retains the "feel" of conventional plaster. The addition of the set preventer allows the plaster to be prepared as a ready-mixed product, eliminating the need to add water and/or additional chemicals at the job site. Any set preventer known to retard set of the calcium sulfate hemihydrate for the shelf life of the product can be used, such as those used in ready-mixed, setting-type joint compounds.

In addition to extending the shelf life of the mixture, the set preventer allows the coating to dry before the calcium sulfate hemihydrate hydrates to the dihydrate form. Once the mixture is applied to the building panel, the water begins to evaporate as it dries. Without the long-acting set preventer, the hemihydrate would also be hydrating, absorbing water to form dihydrate crystals. However, in the present coating, the dihydrate is prevented from forming. When the coating is dried on the building panel, calcium sulfate hemihydrate crystals are dispersed throughout the continuous polymer matrix. After the coating has dried, the calcium sulfate remains in the hemihydrate form in the coating.

At least some embodiments of the invention use a combination of low molecular weight polymers and compounds of polyphosphonic acid as a dual-component set preventer. Both portions of the dual-component set preventer have an affinity to calcium ions and calcium sulfate crystal lattices. These two additives act cooperatively to indefinitely deactivate the set mechanism of the calcium sulfate slurry. This provides a long shelf-life for the packaged plaster product, yet it is ready to use at the job without the addition of extra components such as water or a set accelerator.

The low molecular weight polymer preferably has a molecular weight of from about 2,000 Daltons to about 6,000 Daltons. Some embodiments of the low molecular weight polymer are made from monomers including vinyl acrylates, vinyl acetates, vinyl chlorides, ethylenes, styrenes, substituted styrenes, substituted ethylenes and mixtures thereof. Polymers having a polyamide backbone or carboxylate functional groups are also useful. The amount of the low molecular weight polymer is up to about 8% or from about 0.05% to about 2% by weight based on the weight of the composition. ALCOQUEST 408 and ALCOQUEST 747 (Alco Chemical, Chattanooga, Tenn.) are liquid solutions of polyacrylate and modified polycarboxylate polymers, respectively, having a molecular weight of about 3000. These polymers are particularly well suited for use in the mixture.

The small molecules that are part of the preferred set preventer are any of a number of small molecules. Some small molecules that are useful include polyphosphonic compounds including, but not limited to, tetrasodiumpyrophosphate, tetrapotassiumpyrophosphate, aminotri(methylenephosphonic acid), diethylenetriamine penta(methylene phosphonic acid)trisodium salt, hexamethylene diamine tetra (methylene phosphonic acid), tetrapotassiumpyrophosphate and mixtures thereof. Esters of phosphonic acid compounds are also useful. Other examples of polyphosphonate compounds are revealed in U.S. Pat. Nos. 6,409,824 and 5,788, 857, herein incorporated by reference. The amount of the small molecule used in the mixture is up to about 8% or from about 0.1% to about 2% based on the total weight of the total composition. An example of a suitable small molecule is tetrapotassium pyrophosphate (Astaris, Cateret, N.J.).

Water is added to the mixture during manufacture so that the mixture is ready for immediate use at the job site. The exact amount of water added depends on the desired viscosity of the mixture, typically 90-180 Brabender Units. It is possible to prepare the mixture to have a consistency of either a conventional plaster, a paint or a joint compound. It is preferred that the water be added in the amount of at least 20% the weight of the total composition. For thinner formulations, up to 60% of the weight of the composition can be added is to reduce the opportunity for unwanted chemical reactions, interactions with the components in the formulation or microbial contamination leading to spoilage.

Building panels are coated for either interior or exterior use. One or more additives are optionally added to the mixture prior to application to the building panel to impart particular physical characteristics to the mixture. Examples of suitable additives include, but are not limited to, those facilitating obtaining a particular viscosity, flexural strength, abuse resistance, water resistance, flame resistance, wetting agents, flow improvers, crack preventers, dispersants, mold resistance, drying time, surface hardness, and the like, as well as combinations thereof. Any additive known for use with gypsum may be suitable for use with this mixture as long as it does not negatively interact with the latex polymer emulsion or the set preventer of the invention.

Optionally, a biocide is added to prevent mold or bacterial growth of the composition during its shelf life. If the composition is used shortly after mixing, no biocide is necessary. However, addition of a biocide is needed to maintain a useful shelf life. The amount of biocide will partially depend on the exact biocide selected. If present, some biocides are present in amounts of 0.08% to about 0.5% by weight based on the weight of the components of the mixture. In some embodiments, the biocide is present in amounts of about 0.08% to about 0.3%. Examples of suitable fungicides and biocides are well known in the art include, but are not limited to TROYSAN® 174 bactericide, (Troy Chemical Company, Floram Park, N.J.) and Fungitrol™ 158 fungicide (Fritz Chemical Company, Houston, Tex.).

A humectant or water retainer is optionally added to the mixture for moisture retention. Preferred humectants include propylene glycol, polyethylene glycol and methoxypolypropylene glycol. Combinations of two or all three of the glycols are known to be useful as well. The humectant is used in amounts of about 1-10% by weight of the ready-mixed composition, if present. It reduces water separation and bleed-off during the shelf life of the product. Polyalkylene glycols also hold moisture while the product is being applied, giving it a longer open time. Any water retainers as are known for use with gypsum or cement slurries or architectural paints can be used in this mixture. Some embodiments of the mixture include starch or polyacrylamide as a water retainer.

Ethylene glycol is also optionally added for freeze-thaw stability. When used for this purpose, the ethylene glycol is added in amounts of about 1% to about 5% based on the weight of the composition, and independent of any water retainer present.

The crack reducer is added in amounts of from about 0.1 to about 7% based on the weight of the mixture composition. In the mixture, the addition of starch, such as STARPOL® starches (A. E. Staley Manufacturing Co., Decatur, Ill.) acts to reduce the number of surface cracks in the finished coating.

Another optional component of the coating is an antisedimentation additive. From about 0.05% to about 1% by weight of this additive is used, based on the total weight of the mixture components. The antisedimentation additive reduces bleed off of the liquid as well as sedimentation of the solids. Examples of antisedimentation additives include starches, modified starches, modified clays, such as modified smectite clays, silicates such as modified hydrous sodium lithium magnesium silicates, and mixtures thereof.

Thickeners are optionally added to the ready-mixed plaster compound in amounts of about 0.05% to about 10% by weight of the ready-mixed composition. The thickeners modify the rheology of the mixture composition for better workability and gives the material more slump resistance. Examples of thickeners include modified cellulosics such as the BERMOCOLL® products (Akzo Nobel, Stenungsund, Sweden), microparticle polymer suspensions such as Microspersion™ (Micropowders, Inc., Tarrytown, N.Y.) and polymer micropowders such as the VINNAPAS® products (Wacker Chemicals, Munich, Germany)

Preparation of several embodiments demonstrate the methods of combining the components. Individual compounds need not be combined in any particular order.

At least one embodiment of this invention begins by first dissolving the dual-component set preventer in water. Low molecular weight polyacrylate containing polymer (0.05-2.0%), polyphosphonic compound (0.1-2.0%) and the biocide/fungicide package (0.08-0.5%) are added to water (20-60%) and fully dissolved by stirring at around 60 rpm. Calcium sulfate hemihydrate (40-80%) is dry blended with a modified pregelatinized starch (0.1-7.0%) for 5 minutes to form a dry mixture. Optionally, any combination of a dry wax/PTFE micropowder (0.5-10%), modified smectite clay or phyllo layered silicate clay (0.05-1%) can also be included in the dry mixture. The dry mixture is added slowly to the aqueous component while mixing at 60 rpm or less. Finally, polypropylene glycol (1-10%) and latex emulsion (5-20%) are added with mixing at 60 rpm. Optionally, a wax/PTFE dispersion (0.5-10%) is added at this stage as well. The mixing is complete when lumps are no longer visually discernable, typically 15-20 minutes.

Other embodiments have a biocide for long shelf life. Low molecular weight polyacrylate containing polymer (0.05-2.0%), polyphosphonic compound (0.1-2.0%) and the biocide/fungicide package (0.08-0.5%) are added to water (20-60%) and fully dissolved with stirring at around 60 rpm. Polypropylene glycol (1-10%) and latex emulsion (5-20%) are then added with mixing at 60 rpm for 1-2 minutes. Optionally, a wax/PTFE dispersion (0.5-10%) can be added at this stage as well. Finally, calcium sulfate hemihydrate (40-80%) is dry blended with a modified pregelatinized starch (0.1-7.0%) and optionally, any combination of a dry wax/PTFE micropowder (0.5-10%) or modified smectite clay or phyllo-layered silicate clay (0.05-1%) for 5 minutes. The dry-mixed charge is added slowly to the aqueous component while mixing at 60 rpm or below. The mixing is complete when lumps are no longer visually discernable, typically 15-20 minutes.

Still other embodiments of the invention are made by combining the polyphosphonic compound (0.1-2.0%) and the biocide/fungicide package (0.08-0.5%), which are added to water (20-60%) and fully dissolved with stirring at around 60 rpm. Calcium sulfate hemihydrate (40-80%) is dry blended with a modified pregelatinized starch (0.1-7.0%), low molecular weight polyacrylate containing polymer (0.05-2.0%) and optionally, any combination of a dry wax/PTFE micropowder (0.5-10%) modified smectite clay or phyllo layered silicate clay (0.05-1%) for 5 minutes. The dry mixture is added slowly to the aqueous component while mixing at 60 rpm or below. Finally, propylene glycol (1-10%) and latex emulsion (5-20%) are added with mixing at 60 rpm. Optionally, a wax/PTFE dispersion (0.5-10%) can be added at this stage as well. The mixing is complete when lumps are no longer visually discernable, typically 15-20 minutes. At this time, additional water may be added to the mixture to obtain the desired viscosity.

EXAMPLE 1

A coating mixture was prepared using the components of Table I. ALCOQUEST® 408 (National Starch and Chemical Co., Bridgewater, N.J.) polymer solution, tetrapotassium pyrophosphate and the biocide/fungicide package were added to water and fully dissolved with stirring at 60 rpm. Propylene glycol and latex emulsion were then added with mixing and agitated at 60 rpm for 1-2 minutes. Finally, calcium sulfate hemihydrate was dry blended with STARPOL® 136 starch for 5 minutes. The dry-mixed charge was added slowly to the aqueous component while mixing at 60 rpm or below. The mixing continued at 80 rpm and was complete when lumps were no longer visually discernable.

TABLE I

| Component | Weight | Composition |
| --- | --- | --- |
| Calcium sulfate hemihydrate | 1698 grams | 56.6% |
| Water | 618 grams | 20.6% |
| Polymer emulsion, AC 1265 Vinyl acetate | 459 grams | 15.3% |
| Propylene glycol | 93 grams | 3.1% |
| STARPOL 136 | 60 grams | 2.0% |
| Low MW polymer 48% solution, ALCOQUEST 408 polyacrylate | 30 grams | 1.6% |
| TKPP | 21 grams | 0.7% |
| Biocide package | 3 grams | 0.1% |

The material was applied by a master tradesman to a vertically hung SHEETROCK® brand gypsum panels substrate using a hawk and trowel and conventional two-coat veneer plastering technique. This embodiment had a thicker and stickier application feel and required water troweling. Once the material cured, the surface was hard, smooth and had increased abrasion resistant properties.

EXAMPLE 2

A coating mixture was prepared using the components of Table II. A 45% solution of ALCOQUEST 747, tetrapotassium pyrophosphate, the biocide/fungicide package and FOAMBLAST® 301s defoamer (Lubrizal Corp., Wickliffe, Ohio) were added to water and fully dissolved with stirring at around 60 rpm. Propylene glycol and HP 41-830 were then added with mixing and agitated at 60 rpm for 1-2 minutes. Finally, calcium sulfate hemihydrate was dry blended with STARPOL 136 (2.0%) and LAPONITE synthetic smectite clay (Rockwood Additives Ltd., UK) for 5 minutes. The dry-mixed charge was added slowly to the aqueous component while mixing at 60 rpm or below. The mixing continued at 80 rpm until no lumps were visually discernable.

TABLE II

| Component | Weight | Composition |
| --- | --- | --- |
| Calcium sulfate hemihydrate | 2464 grams | 61.6% |
| Water | 884 grams | 22.1% |
| Polymer emulsion, HP 41-830 Vinyl acetate | 332 grams | 8.3% |
| Propylene glycol | 124 grams | 3.1% |
| STARPOL 136 | 80 grams | 2.0% |
| Low MW polymer 45% solution, Alcoquest 747 polyacrylate | 64 grams | 1.6% |
| TKPP | 24 grams | 0.6% |
| LAPONITE ® | 20 grams | 0.5% |
| FOAMBLAST ® 301s | 4 grams | 0.1% |
| Biocide package | 4 grams | 0.1% |

The material was applied by a master tradesman to a vertically hung SHEETROCK® brand gypsum panel substrate using a hawk and trowel and conventional two-coat veneer plastering technique. The material was more resistant to bleedout water upon storage, however, the feel of the material changed. Once the material cured, the surface was smooth and had comparable abrasion properties with plaster.

EXAMPLE 3

A ready-mixed plaster composition was made with the components of Table I. ALCOQUEST 408 polyacrylate polymer and the tetra potassium polyphosphonic compound (TKPP) were added to the water and fully dissolved by stirring at around 60 rpm. Calcium sulfate hemihydrate was dry blended with the STARPOL 136 pregelatinized starch for five minutes to form a dry mixture. The dry mixture was slowly added to the aqueous component while mixing at about 60 rpm or less. Propylene glycol and the HP 41-803 vinyl acetate latex emulsion were added to the composition while it was mixed at 60 rpm. The mixing was continued until lumps were no longer visually discernable.

TABLE III

| Component | Weight | Composition |
|---|---|---|
| Calcium sulfate hemihydrate | 1500 grams | 61.6% |
| Propylene glycol | 75 grams | 3.1% |
| STARPOL 136 | 10 grams | 0.4% |
| Polymer emulsion, HP 41-803 Vinyl acetate | 250 grams | 10.3% |
| Low MW polymer 48% solution, ALCOQUEST 408 polyacrylate | 18.6 grams | 0.8% |
| TKPP | 9 grams | 0.4% |
| Water | 571 grams | 23.4% |

The material was applied by a master tradesman to a vertically hung SHEETROCK® brand gypsum panel substrate using a hawk and trowel and conventional two-coat veneer plastering technique. The material was much less sticky than joint-compound, was more manageable and was troweled smooth without leaving lap marks or requiring sanding. These properties make the material far more superior to joint compounds used for skim coating applications. The material did not feel exactly like a powder mixed plaster under the trowel, but offered a good compromise between application properties and convenience. Once the material cured, the surface was smooth, crackfree and had comparable abrasion properties with plaster.

EXAMPLE 4

A 45% solution of ALCOQUEST 747 (1.6%), tetrapotassium pyrophosphate (0.4%), the biocide/fungicide package (0.1%) and FOAMBLAST® 301s defoamer (0.6%) were added to water (20.2%) and fully dissolved with stirring at 60 rpm. Propylene glycol (3.1%) and HP 19-176 (12.8%) were then added along with Microspersion® 250-50 micronized wax (T.H. Hilson Co., Wheaton, Ill.) (3.6%) at 60 rpm and mixed for 1-2 minutes. Finally, calcium sulfate hemihydrate (56.6%) was dry blended with STARPOL 136 (1.0%) for 5 minutes. The dry-mixed charge was added slowly to the aqueous component while mixing at 60 rpm or below. The mixing continued at 80 rpm until no lumps were visually discernable.

While particular embodiments of the non-hydrating plaster composition and method have been shown and described, it will be appreciated by those skilled in the art that changes and modifications may be made thereto without departing from the invention in its broader aspects and as set forth in the following claims.

What is claimed is:

1. A coated panel comprising:
   a building panel; and
   a dried coating comprising about 50% to about 93.7% calcium sulfate hemihydrate and a set preventer distributed throughout a latex polymer matrix, wherein said coating is substantially water-free and wherein said set preventer comprises compounds of polyphosphonic acid or esters thereof.

2. The coated panel of claim 1, wherein said calcium sulfate hemihydrate comprises alpha-calcined gypsum, beta-calcined gypsum or mixtures thereof.

3. The coated panel of claim 1 wherein said polyphosphonic acid compounds are one or more of the group consisting of aminotri(methylene-phosphonic acid), diethylenetriamine penta (methylene phosphonic acid) trisodium salt, hexamethylene diamine tetra(methylene phosphonic acid) and mixtures thereof.

4. The coated panel of claim 1, further comprising an antisedimentation additive.

5. The coated panel of claim 4 wherein said antisedimentation additive comprises one of a modified clay, a silicate and mixtures thereof.

6. The coated panel of claim 1 wherein said latex polymer comprises monomers selected from the group consisting of vinyl acrylate, vinyl acetate, vinyl chloride and ethylene.

7. The coated panel of claim 1 further comprising a non-emulsion polymeric crack preventer present in amounts of about 0.1% to about 7% based on the total weight of the composition.

8. The coated panel of claim 1 further comprising a biocide.

9. The coated panel of claim 1 further comprising an organic water retainer.

10. The coated panel of claim 1, wherein said polyphosphonic acid compound is present in amounts of about 0.1% to about 2.0% based on the total weight of the composition.

11. The coated panel of claim 1, wherein said set preventer further comprises a low molecular weight polymer having a molecular weight less than 6,000 Daltons.

12. The coated panel of claim 11, wherein said low molecular weight polymer comprises monomers selected from the group consisting of vinyl acrylate, vinyl acetate, vinyl chloride and ethylene, styrene and substituted styrenes.

13. The coated panel of claim 11, wherein said low molecular weight polymer is present in amounts of about 0.05% to about 2.0% based on the total weight of the composition.

* * * * *